Aug. 21, 1934.  E. F. MARTINET  1,970,666
SUCTION CLEANING APPARATUS
Filed April 10, 1931  4 Sheets-Sheet 1
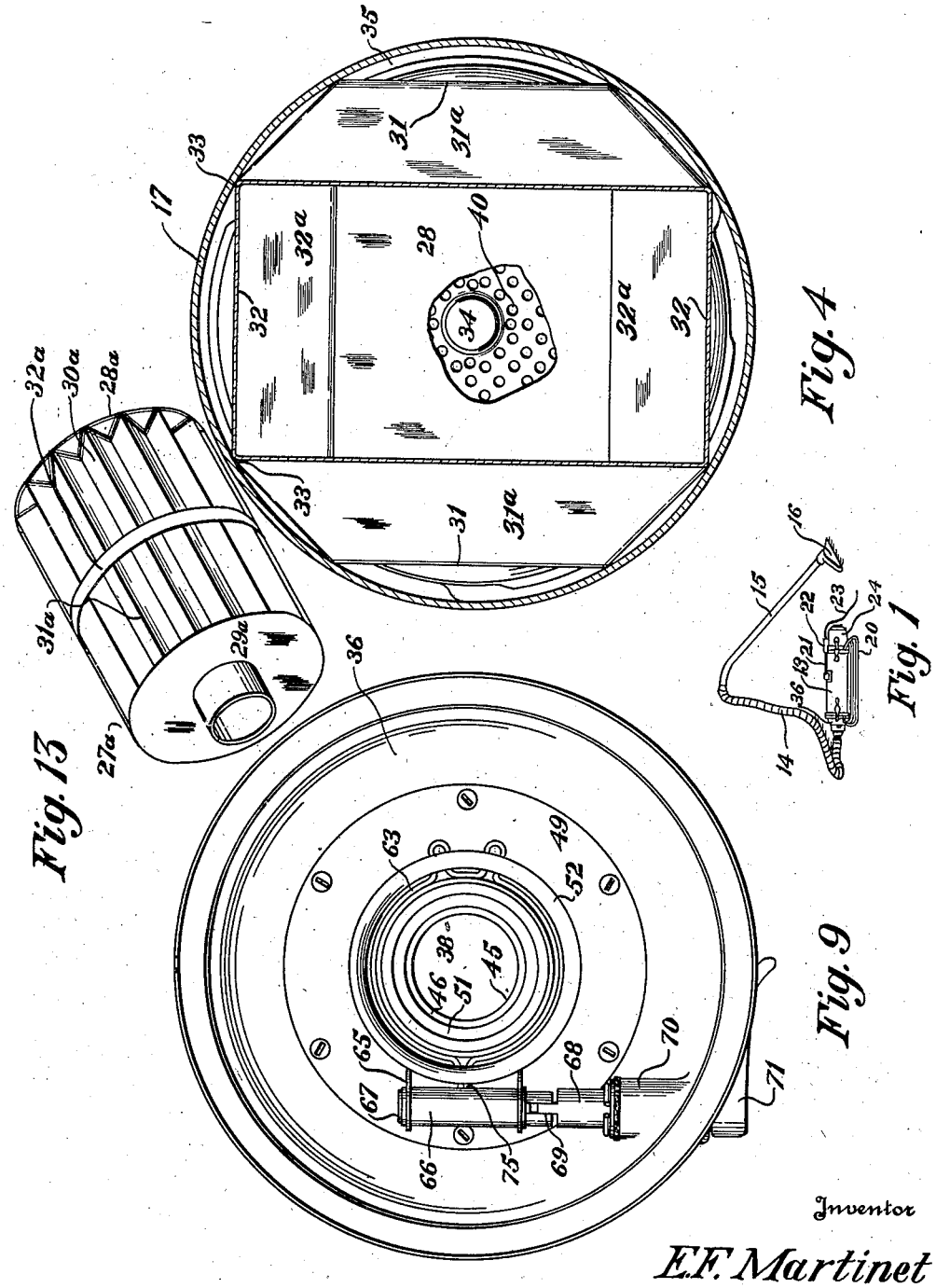
Inventor
E. F. Martinet
By Frease and Bishop
Attorneys Aug. 21, 1934.   E. F. MARTINET   1,970,666
SUCTION CLEANING APPARATUS
Filed April 10, 1931   4 Sheets-Sheet 2
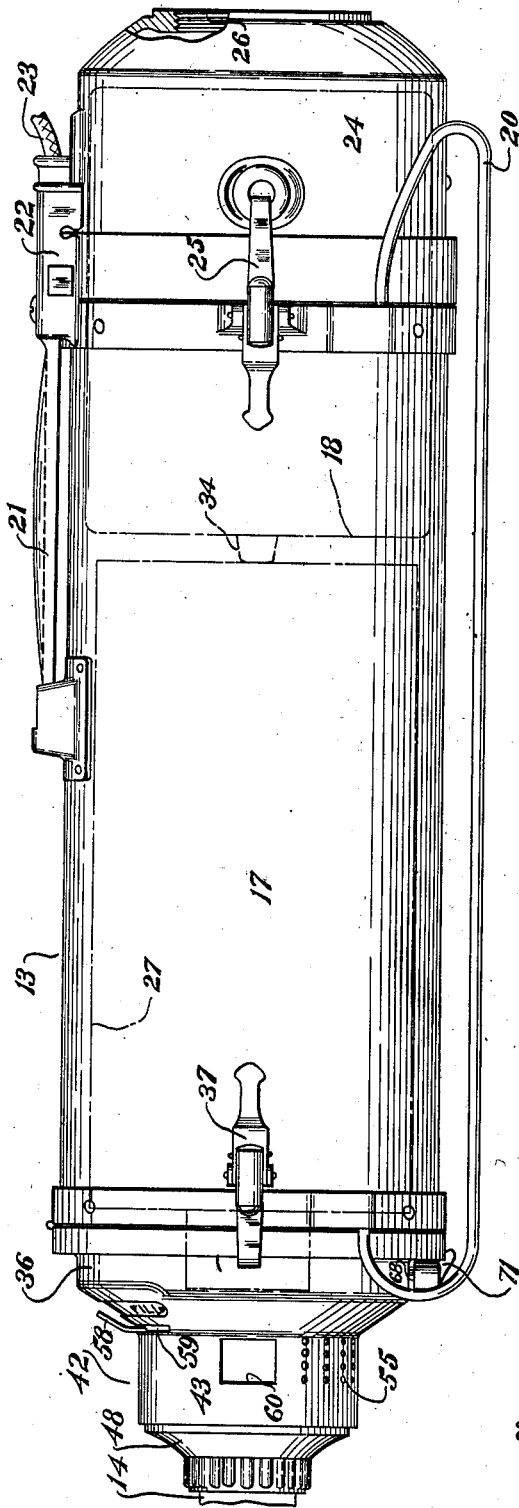
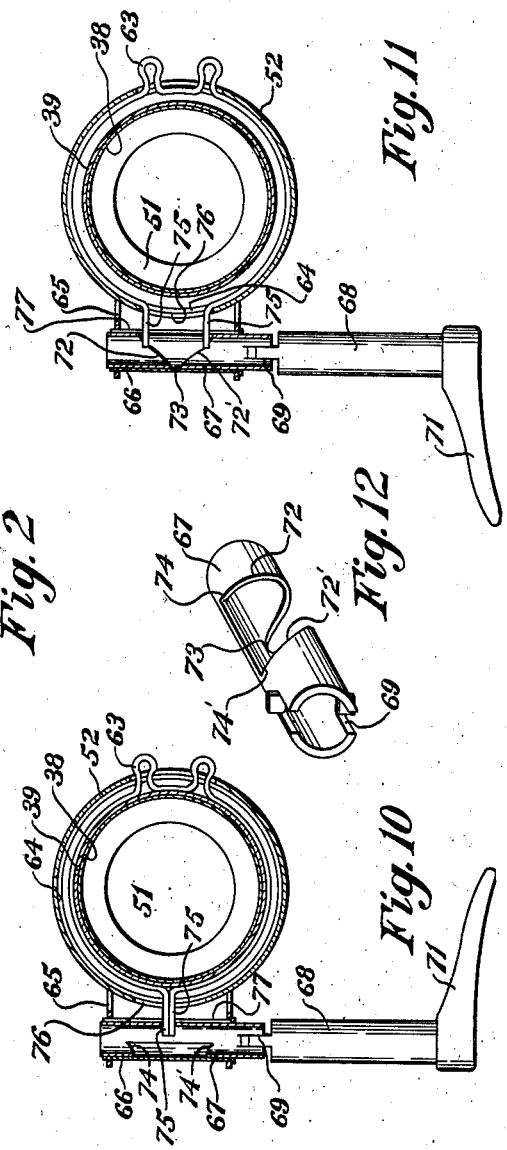
Inventor
E. F. Martinet
By Frease and Bishop
Attorneys

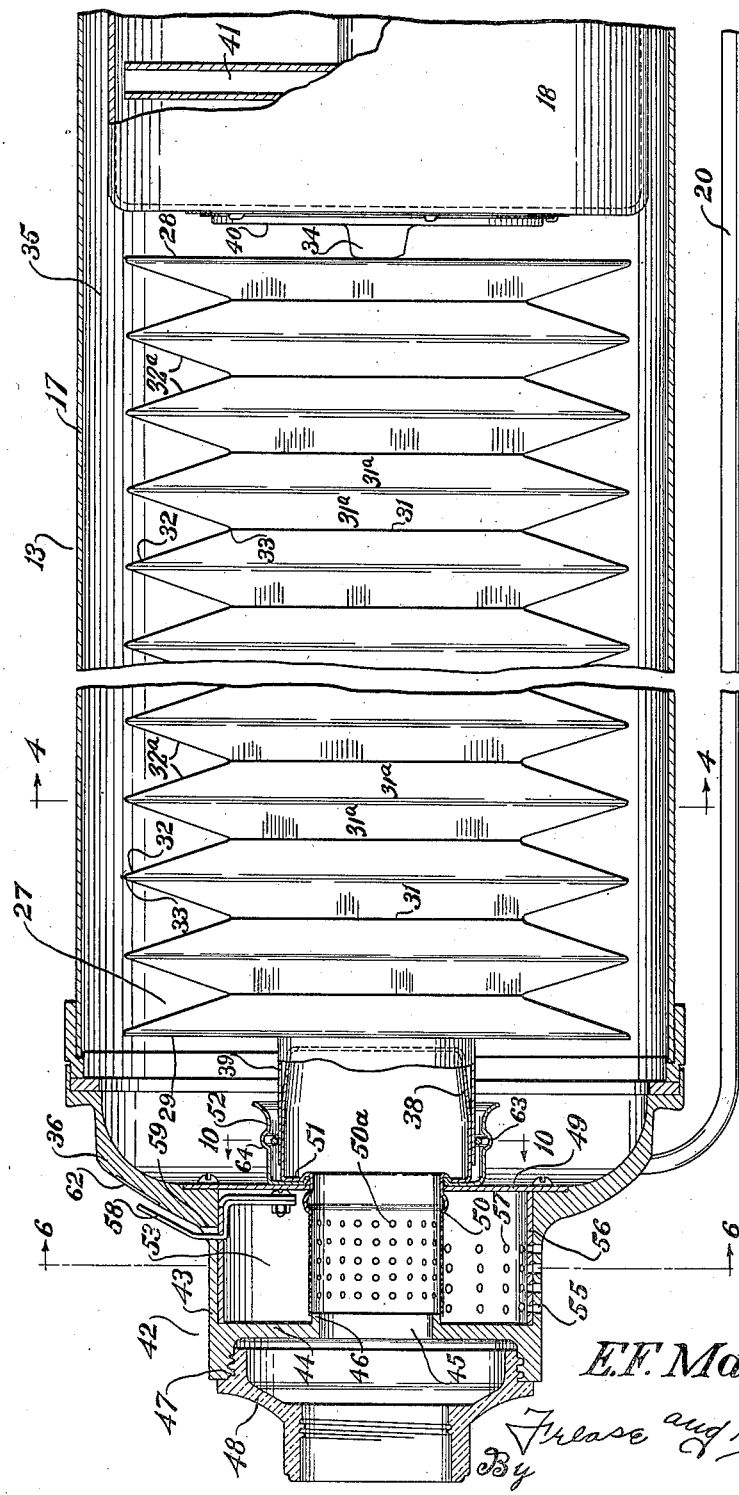

Aug. 21, 1934.  E. F. MARTINET  1,970,666
SUCTION CLEANING APPARATUS
Filed April 10, 1931   4 Sheets-Sheet 4
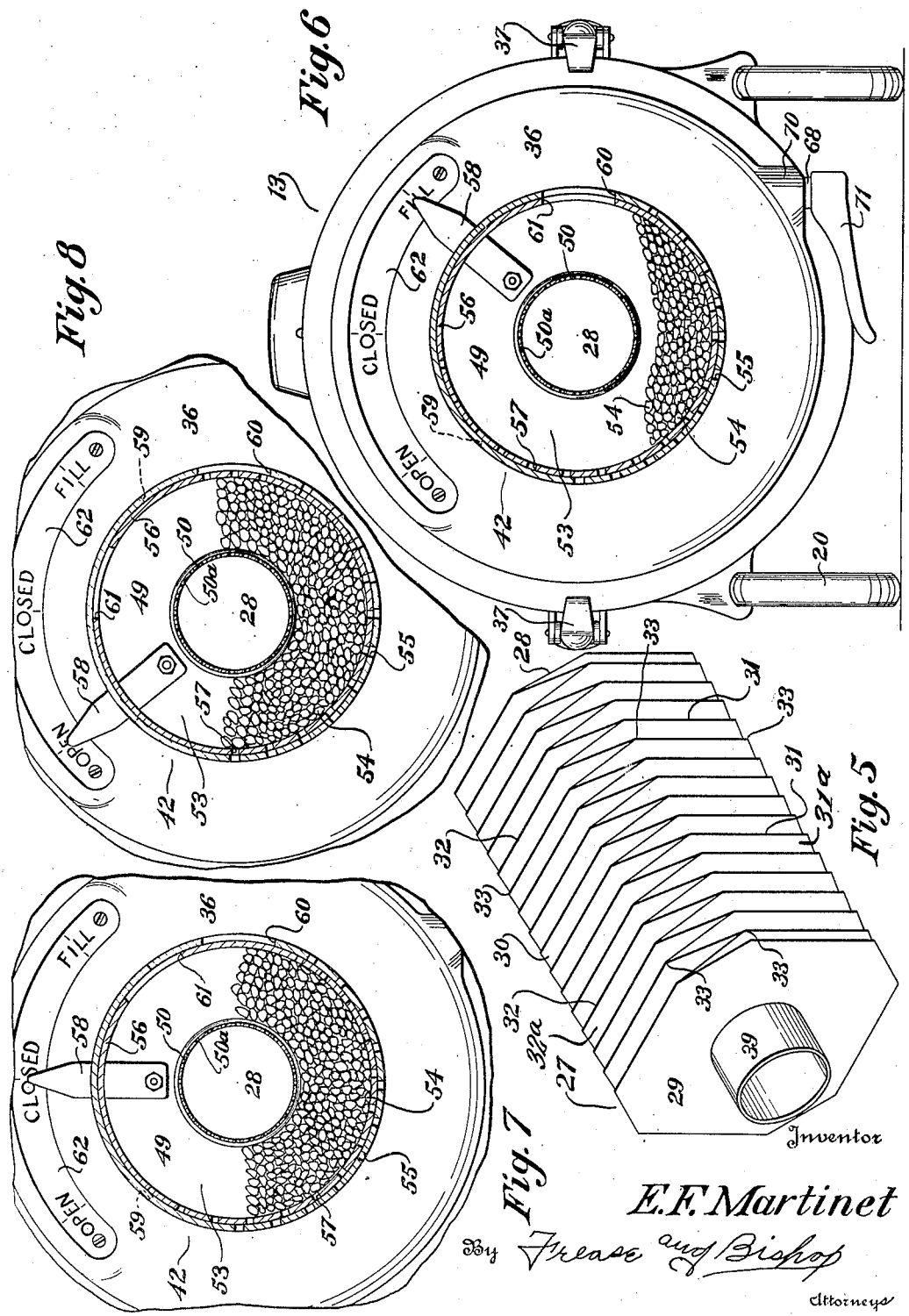

Patented Aug. 21, 1934

1,970,666

UNITED STATES PATENT OFFICE 1,970,666

SUCTION CLEANING APPARATUS

Eugene F. Martinet, Cleveland, Ohio, assignor to The P. A. Geier Company, Cleveland, Ohio, a corporation of Ohio Application April 10, 1931, Serial No. 529,136

4 Claims. (Cl. 183—51)

The invention relates to suction cleaning apparatus and more particularly to improvements in dust collector construction.

A suction cleaner employs air currents to perform the cleaning operation by utilizing an exhauster fan operated by any suitable means to induce a suctional air flow into a nozzle or other attachment held in contact with or adjacent to the surface or article being cleaned, and to exhaust the air currents issuing from the cleaner into the atmosphere, a dust or refuse collector or receptacle being interposed in the air duct system, in series between the nozzle and atmospheric exhaust, either before or after the fan chamber of the exhauster fan, for filtering or separating dust or refuse entrained in the air currents from the air currents exhausted into the atmosphere.

The efficiency of a suction cleaner is dependent upon the suction created at its nozzle, which in turn is dependent upon the available or effective filtering area presented in the dust collector. Thus, a dust collector including a cloth, fabric or paper filtering bag or receptacle, originally has a certain predetermined amount of available filtering area through which the air currents may pass, the entrained dust or refuse being separated from the air currents and retained within the receptacle, and the finer particles of dust and the like being deposited on the interior surface of the cloth, fabric or paper filtering receptacle.

The deposit of fine particles of dust and the like, during use of the cleaner, on the interior surface of the filtering receptacle, reduces the available or effective filtering area thereof and causes a resistance to the flow of air currents through the air duct system, creating a back pressure in the receptacle, with the result that the suction created by the cleaner at the nozzle, and the consequent efficiency of the cleaner, is decreased.

Of course the effective filtering area of the dust collector can be increased by enlarging the outside dimensions of the dust collector, but convenient and practical operation of a suction cleaner restricts the size of dust collectors to such extent that only an inefficient or insufficient suction exists at certain times.

It is therefore an object of the present invention to provide a dust collector construction for suction cleaners which more or less doubles the effective available filtering area thereof, without increasing the overall dimensions or size of the dust collector.

For sanitary and other reasons, the filtering receptacle providing an increased available filtering area is preferably, though not necessarily, made of inexpensive, tough, porous, filtering paper, so that the receptacle when filled with dust and refuse may be bodily thrown away, destroyed or burned, without being emptied, and may then be replaced by a new filtering receptacle. Accordingly it is desirable to conveniently remove or detach a filtering receptacle from a suction cleaner, without requiring the filtering receptacle, per se, or its contents, which are to be destroyed, to be touched by the operator, so that the removal and destruction of the same may be accomplished in a sanitary manner.

It is therefore a further object of the present invention to provide dust receptacle connections, which may be readily and conveniently operated to release the dust receptacle from connection with the suction cleaner, without requiring the dust receptacle to be touched in any manner by the operator of the cleaner.

These and other objects may be obtained by a construction, preferred embodiments of which are shown in the drawings and hereinafter described in detail, which may be stated in general terms as including in suction cleaning apparatus having an air duct system including inlet means, an exhauster fan, and outlet means, a dust collector in the air duct system including a tubular expansible accordion-pleated filtering receptacle, and means for restricting expansion of the receptacle.

In the drawings, Figure 1 is a small perspective view of suction cleaning apparatus in operation, in which the present improvements are incorporated;

Fig. 2 is an enlarged side view of the main unit of a suction cleaner equipped with the present improvements, the main unit containing a fan, motor, and the improved dust receptacle, connection means, and vaporizer attachment, the unit being adapted for connection with an air conduit or hose to which a nozzle or cleaning tool may be attached;

Fig. 3 is a longitudinal cross section through the main unit illustrating the improved dust collector, connection means and vaporizer;

Fig. 4 is a cross section through the main unit taken on the line 4—4, Fig. 3;

Fig. 5 is a perspective view of the improved tubular, expansible accordion-pleated dust receptacle;

Fig. 6 is a sectional view through the improved vaporizer attachment looking toward the front end of the main unit taken on the line 6—6, Fig. 3, showing the vaporizer valve in "filling" position;

Fig. 7 is a fragmentary view similar to Fig. 6 showing the vaporizer valve in "closed" position;

Fig. 8 is a fragmentary view similar to Fig. 6 showing the vaporizer valve in "open" position;

Fig. 9 is an elevation of the improved dust receptacle connection plate looking toward the clamping means side thereof;

Fig. 10 is a detached sectional view of the connector clamping means taken as on the line 10—10, Fig. 3, showing the connector clamping means in clamped position;

Fig. 11 is a view similar to Fig. 10 showing the clamping means in released position;

Fig. 12 is a perspective view of the operating sleeve of the clamping means; and Fig. 13 is a perspective view of a modified form of expansible pleated dust receptacle.

Similar numerals of reference indicate corresponding parts throughout the various figures of the drawings.

A standard type of suction cleaning apparatus is shown in Fig. 1, which includes a main unit 13, preferably a flexible air hose 14 connected thereto, preferably an extension 15 connected to the hose 14, and a suitable nozzle tool 16.

The main unit 13 includes a preferably tubular sheet metal outer shell 17 and a combined motor and exhauster housing 18 mounted at one end thereof indicated in dot-dash lines in Fig. 2, all mounted on runners 20 forming a movable base for the unit. The unit 13 is also provided with a strap handle 21, while the motor thereof is preferably controlled by an electric switch 22 in circuit with the power supply wires 23. The outer end of the motor exhauster housing is preferably surrounded by a detachable outer shell 24, secured by clamps 25 to the shell 17, and having a central opening 26 in the end wall thereof forming an exhaust outlet for the unit.

The parts, per se, thus far described form no part of my present invention, but are shown for illustrating one of many types of suction cleaners which may be equipped with the present improvements. It is understood, however, that the present improvements may be applied to other types of suction cleaners, and that the present invention consists in the novel improvements and combinations herein set forth.

The improved dust receptacle shown in Fig. 5, generally indicated at 27, and indicated in general outline only by dot-dash lines in Fig. 2, has its end walls 28 and 29 connected together by a generally tubular-shaped axially expansible, bellows-like, accordion-pleated wall 30. Thus, the dust receptacle may be likened unto a "Chinese Lantern", or unto the bellows of an accordion, the compound double folds, or alternate pleats 31 and 32, thereof, permitting compression and expansion of the receptacle in an accordion-like manner.

The upper and lower accordion-like folds or pleats 32, (Figs. 3, 4 and 5) comprise alternate transverse ridges and depressions between which the wall portions 32a extend, and the side folds or pleats 31 (Figs. 3, 4 and 5) comprise alternate transverse ridges and depressions between which the wall portions 31a extend. As shown in Figs. 3, 4 and 5, the pleats 32 are zig-zag folded transverse to the longitudinal axis of the dust receptacle and alternate with the zig-zag folded pleats 31; and each pleat 31 or 32 extends through a portion only of the periphery of the dust receptacle 27, and is staggered with respect to the peripherally adjacent pleats, so that the ridge of each pleat is aligned with the depression between peripherally adjacent pleats and each ridge intersects each depression at a corner 33. Such receptacles 27 may be made by hand or by machines similar to the way in which the bellows of an accordion or the shield of a camera are made.

The walls 28, 29 and 30 of the dust receptacle 27 are made of a fine mesh filtering material which may be cloth, or fabric; but which is preferably a tough, porous, filtering paper so as to present an ideal filtering medium for the dust collector.

It will be observed by inspecting Fig. 5, that the accordion-pleated filtering receptacle 27, because of the compound folds 31 and 32, presents a filtering area substantially double that which would be presented by a plain bag having the same outside or overall dimensions.

It is understood that a porous paper receptacle suitable for filtering purposes in a suction cleaner does not have sufficient strength to be self-sustaining against bursting because of the pressure of air currents filtered therethrough and exhausted therefrom, or to resist or withstand blows from, or impact with sharp objects. For these reasons, the filtering receptacle 27 is arranged within the cleaner container shell 17 so that some of the corners 33 thereof between the folds 31 and 32 contact against the inner surface of the shell to sustain the paper receptacle against bursting.

Moreover, the expansible receptacle 27 is permitted to expand only partially of its full expansible length to prevent the side folds 31 and 32 from being bellied outward in contact with the inner surface of the shell 17, in which event, air currents could not be filtered through the paper walls thereof. The full or complete expansion of the receptacle 27 is restricted by contact of the end wall 28 thereof against the pad 34 which projects from the motor-exhauster housing 18 into the dust collector compartment 35 of the shell 17.

The suction cleaner apparatus shown in the drawings is of a type in which the dust collector is interposed between the nozzle and exhauster fan, the shell 17 thereof having its inlet end provided with a closure, connector plate generally indicated at 36, clamped to the shell by clamps 37; and the plate 36 is provided with an inwardly extending tubular neck or sleeve 38, to which the tubular neck or sleeve 39, of the accordion-pleated receptacle 27, may be clamped preferably in a manner hereinafter described in detail.

Thus the shell 17, the closure plate 36, and the accordion-pleated filtering receptacle 27 form a dust collector in which dust-laden air currents induced by the suction created by the exhauster fan 41 in the exhauster housing 18, are drawn in through the tubular necks 38 and 39, the dust being separated therefrom in the receptacle 27, while the air currents filter through the porous walls of the same into the compartment 35, formed between the shell 13 and outer surfaces of the receptacle 27, and pass through the perforated end wall 40 (Fig. 4) of the motor-exhauster housing 18, through the exhauster housing, and through the exhaust outlet 26 to the atmosphere.

The improved vaporizer device or attachment generally indicated at 42 in Fig. 3, is preferably formed integrally with the closure plate 36 by providing a tubular extension 43 thereon, closed by an end wall 44, provided with a central opening 45, surrounded by an inwardly projecting annular flange 46. The outer end of the tubular extension 43 is preferably threaded at 47 to receive the hose coupling adapter member 48, to which the hose 14 is connected.

A disk plate 49 is attached to the plate 36 at the inner end of the tubular extension 43, while a tubular air duct member 50 extends between the end wall 44, and disk plate 49, being journaled on the flange 46 at one end and extended through a central aperture in the disk plate 49 at its other end. The member 50 is preferably formed integrally with the tubular neck 38 by providing a connecting portion 51 therebetween, which serves to clamp the connector clamp guard member 52 to the disk plate 49.

An annular toroidal-shaped compartment 53 is thus formed between the tubular extension 43, the end wall 44, the tubular member 50, and the disk plate 49 which serves as a storage compartment for any desired type of crystals 54 or reagent, which it may be desirable to use in the vaporizer attachment (Figs. 6, 7 and 8).

The tubular extension 43 is provided with a plurality of openings 55 in its lower portion, which form air inlet passages for the compartment 53, while the tubular duct member 50 is perforated as shown at 50a to provide outlet passages communicating between the compartment 53 and the suction cleaner air duct system of which the duct member 50 forms a part, the inlet passages 55, compartment 53, and outlet passages 50a forming auxiliary air inlet passages for the suction cleaner air duct system.

A tubular rotary sleeve valve 56 is rotatably mounted in the tubular extension 43 and is provided with a plurality of apertures 57 which register with the apertures 55 when the operating lever 58 thereof, which projects through a slot 59 provided in the tubular extension 43, is in "open" position as shown in Fig. 8.

The tubular extension 43 is also provided with an enlarged filling aperture 60 with which a similar enlarged aperture 61, provided in the sleeve valve 56, registers, when the sleeve valve is operated to "filling" position, as shown in Fig. 6, at which time the desired crystals may be introduced into the storage compartment 53 through the aligned filling apertures 60 and 61. When the sleeve valve is operated to "closed" position indicated in Fig. 7, communication between the atmosphere and the compartment 53 is cut off, because the inlet openings 55 and filling aperture 60 in the outer compartment wall 43, are closed by the valve member 56.

The outer surface of the closure plate 36 preferably carries a designating strip 62 carrying lettering "open," "closed", and "fill", to indicate the various positions to which the operating member 58 may be readily and conveniently moved to selectively rotate the valve member to "open", "closed", or "filling" position, respectively.

The improved dust receptacle connection means includes the tubular neck or sleeve 38 which extends inwardly from the inner side or surface of the connector plate 36, the clamp member 52 surrounding and spaced therefrom, and the resilient split wire ring member 63 which normally springs outwardly to the position shown in Fig. 11, wherein the wire ring member 63 is seated in an annular recess 64 provided in the guard member 52.

A bracket 65 carrying a tubular sleeve 66 is mounted preferably on the guard member 52 and an operating sleeve 67 shown in Fig. 12 is rotatably journaled therein. The rotatable operating shaft 68, coupled with the operating sleeve at 69, is journaled at 70 in the connector plate 36, and is provided at its outer end with an operating handle 71 accessibly located on the opposite side of the connector plate 36 from the side from which the sleeve 38 extends, for a purpose which will be hereinafter described.

The operating sleeve 67 is provided with matched cylindrical cam faces 72 and 72', which join each other at 73 and are widely separated at 74 and 74'. The split ring clamping wire 63 is provided with finger ends 75 which project through slots 76 and 77 provided, respectively, in the clamp guard 52, and sleeve member 66, and the fingers 75 operatively engage the cam faces 72 and 72'.

In connecting a dust receptacle to the connector plate 36, the operating handle 71 is actuated to released position shown in Fig. 11, and the tubular neck 39 of the same is loosely slipped or telescoped over the connector neck 38 accessible at one side of the plate 36, whereupon the operating handle 71 is moved to rotate the operating shaft 68 and sleeve 67 to the position shown in Figs. 3, 6, 9 and 10. In this position, the cam faces 72 and 72' draw the wire fingers 75 together to securely clamp the neck 39 to the neck 38 as best shown in Fig. 3. It is pointed out that the outer ends of the neck 38 and of the clamp guard 52 are flared inwardly and outwardly, respectively, to assist in readily telescoping the receptacle neck 39 over the connector neck 38 also shown in Fig. 3.

The replacement or renewal of a dust receptacle may be accomplished by standing the cleaner unit on its right hand end, (Fig. 2), releasing the clamps 37, and lifting the connector plate 36 upward from the shell 17 to draw the dust receptacle 29 out of the compartment formed by the shell 17. The plate 36 is then held over a garbage can, ash can, waste paper basket or the like, and the clamping means operating handle 71, located on the upper or outer side of the plate 36 is moved to released position so as to release the clamped connection of the dust receptacle 29 to the connector neck 38. The receptacle 29 then drops by gravity into the place of disposal without having been touched in any manner by the hands of the operator, thus avoiding a transfer of dust or germs from the same to the operator.

A new receptacle 29 may then be connected to the connector plate 36 and the same assembled in connection with the shell 17 in reverse order, whereupon the suction cleaner may be operated in the desired manner.

The air duct system of the suction cleaning apparatus shown herein through which air currents are drawn or exhausted by the exhauster fan, includes the main inlet opening of the nozzle or other tool 16, the tubular pipe or extension 15, the hose 14, hose coupling member 48, opening 45, air duct member 50, connector neck 38, dust receptacle 27, compartment 35, perforated end wall 40, motor-exhauster housing 18, and exhaust outlet 26.

However, all types of suction cleaning apparatus are provided with such an air duct system, but the dust receptacle in many cases is located in the system behind the exhauster fan rather than in front of the same as shown herein. Accordingly, the improvements herein described are not limited to the particular relative arrangement of location of the various elements of the air duct system.

The suction cleaner may be operated with the vaporizer valve 56 operated to "closed" position, shown in Fig. 7, whereupon air currents drawn through the air duct system will not materially affect or be affected by any crystals or other reagents stored in the vaporizer container compartment 53. However, upon movement of the valve member 56 to "open" position, shown in Fig. 8, an auxiliary stream of air flows through the aligned passages 55, 57, through and around the crystals 54, and through the passages 50a into the main stream of air flowing through the air duct system. The auxiliary air currents passing through the vaporizer compartment 53 are impregnated with fumes from the crystals, and thereafter become thoroughly mixed with, and act upon, the main air stream in the air duct system and the matter entrained thereby, to subject the same and the contents of the dust receptacle 27 to the purifying, disinfecting, or sterilizing action of the crystal fumes.

When the supply of crystals in the compartment 53 decreases with use, the same may be replenished by moving the valve 56 to "filling" position, shown in Fig. 6, whereupon additional crystals may be introduced into the compartment 53 through the enlarged aligned apertures 60 and 61.

It is understood that the apparatus may be operated as a blower, preferably by removing the dust receptacle 29, connector plate 36, vaporizer attachment and hose, and by connecting the adapter coupling 48 supplied with a hose or other tool, to the exhaust outlet 26. Alternately, the dust receptacle 29 may or may not be removed, and the adapter 48 and hose or other tool is connected with the exhaust outlet 26 so that when the apparatus is operated as a blower the air currents blown therefrom may be subjected to the action of, or impregnated with fumes from crystals or other reagents contained in the vaporizer compartment 53.

An alternate form of dust receptacle 27a is shown in Fig. 13, wherein the end walls 28a and 29a are connected together by a tubular wall 30a longitudinally fluted or pleated at 31a. The receptacle 27a may also be made of porous filtering paper and is substantially radially expansible, complete radial expansion being restricted by one or more flexible annular bands 32a suitably attached to the edges of the folds or pleats 31a.

I claim:

1. A tubular dust receptacle for suction cleaners and the like, the receptacle including dust-filtering walls comprising accordion-like pleats extending transverse to the longitudinal axis of the receptacle, each pleat extending through a portion only of the periphery of the receptacle, and each pleat being staggered with respect to the peripherally adjacent pleats so that the ridge of each pleat is aligned with the depression between peripherally adjacent pleats.

2. A longitudinally expansible tubular dust receptacle for suction cleaners and the like, the receptacle including dust-filtering, paper walls comprising accordion-like zig-zag folded pleats with alternate transverse ridges and depressions, each pleat extending through a portion only of the periphery of the receptacle, and each pleat being staggered with respect to the peripherally adjacent pleats so that the ridge of each pleat is aligned with the depression between peripherally adjacent pleats.

3. A dust collector for suction cleaners including a tubular sheet metal shell having an inner surface, and a tubular dust receptacle in said shell including dust-filtering walls comprising accordion-like pleats extending transverse to the longitudinal axis of the receptacle, each pleat extending through a portion only of the periphery of the receptacle, and each pleat being staggered with respect to the peripherally adjacent pleats so that the ridge of each is aligned with the depression between peripherally adjacent pleats, and the corner where the ridge of each pleat intersects with the depression between peripherally adjacent pleats contacting with the inner surface of said tubular shell.

4. In a suction cleaner, a dust collector including a folded, bellows-shaped, filtering, dust receptacle, and a container therefor having an inner surface, there being corners between peripherally adjacent folds, and the corners contacting with the inner surface of said container.

EUGENE F. MARTINET.